Figure 1:
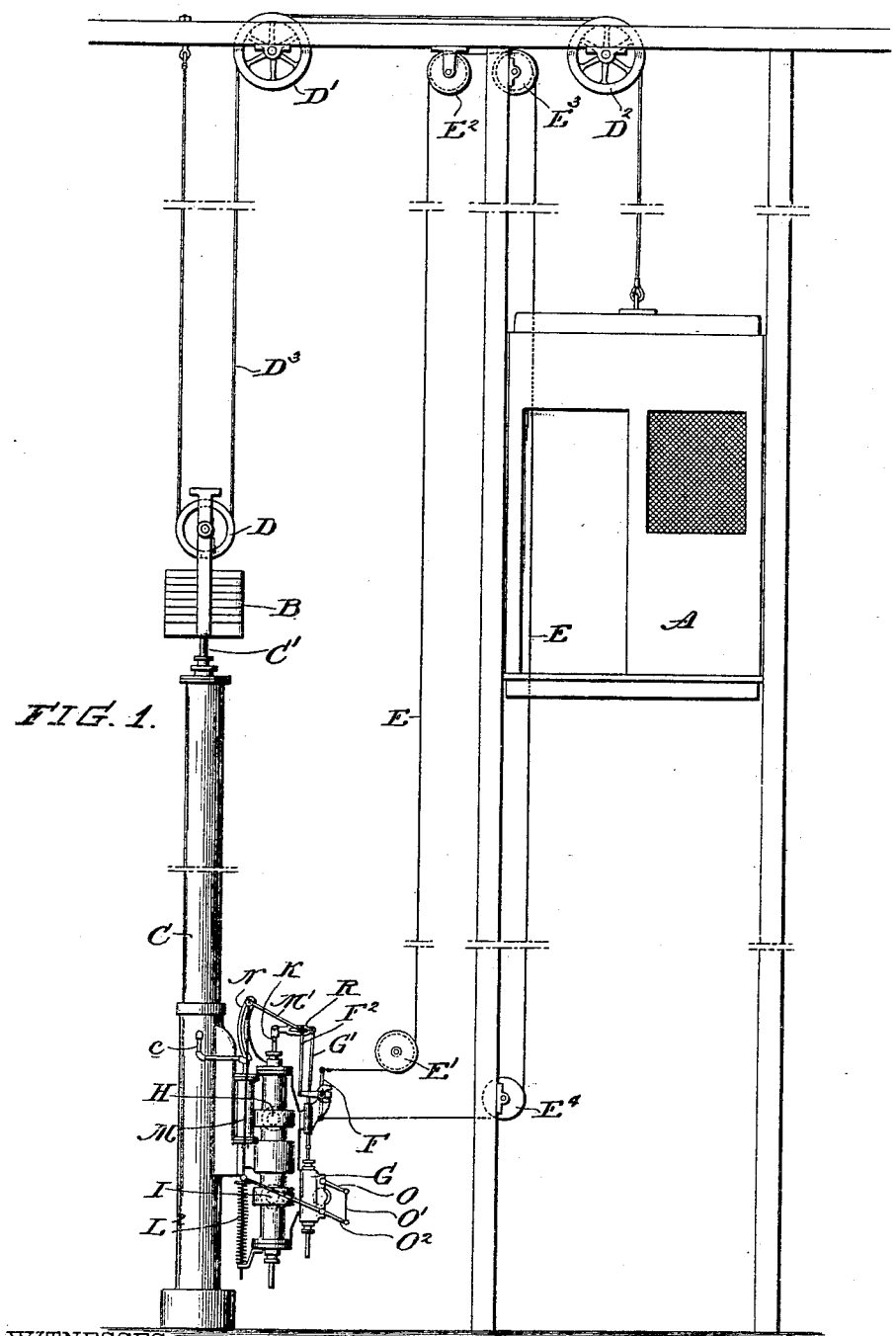

No. 623,152. Patented Apr. 18, 1899.
F. E. HERDMAN.
SPEED REGULATING DEVICE FOR HYDRAULIC ELEVATORS.
(Application filed Oct. 8, 1898.)
(No Model.) 5 Sheets—Sheet 1.

WITNESSES: INVENTOR

No. 623,152. Patented Apr. 18, 1899.
F. E. HERDMAN.
SPEED REGULATING DEVICE FOR HYDRAULIC ELEVATORS.
(Application filed Oct. 8, 1898.)

(No Model.) 5 Sheets—Sheet 2.

WITNESSES: INVENTOR

No. 623,152. Patented Apr. 18, 1899.
F. E. HERDMAN.
SPEED REGULATING DEVICE FOR HYDRAULIC ELEVATORS.
(Application filed Oct. 8, 1898.)
(No Model.) 5 Sheets—Sheet 3.
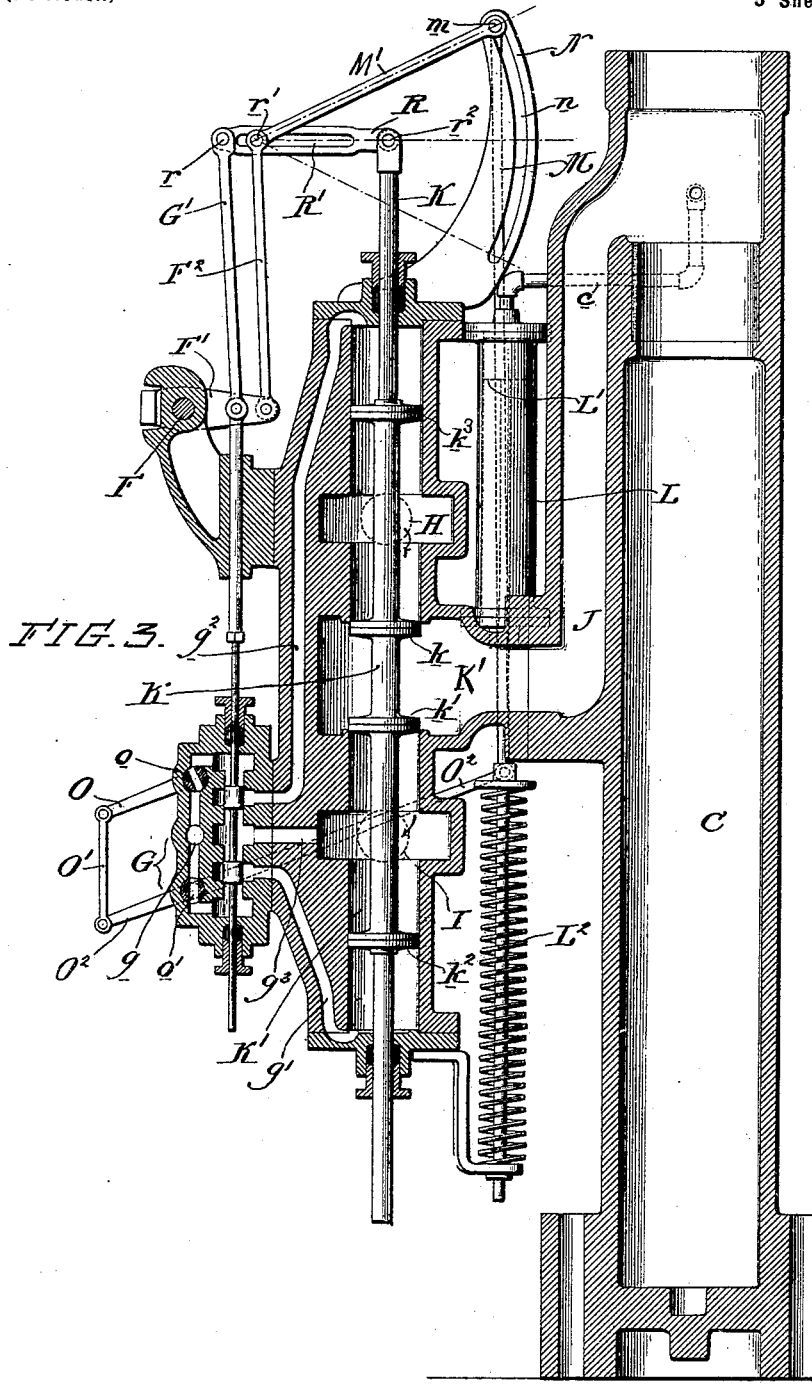
WITNESSES: INVENTOR

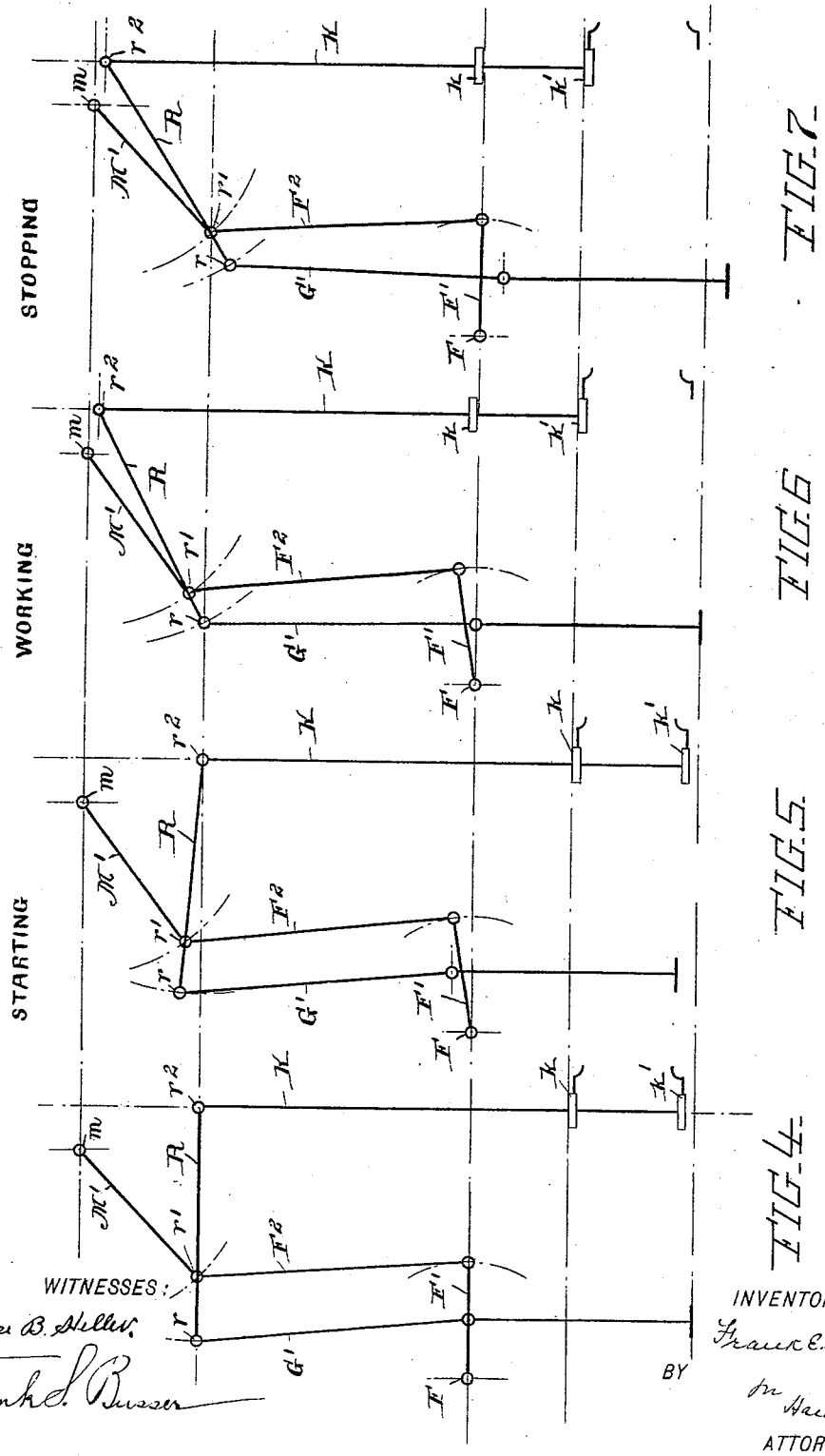

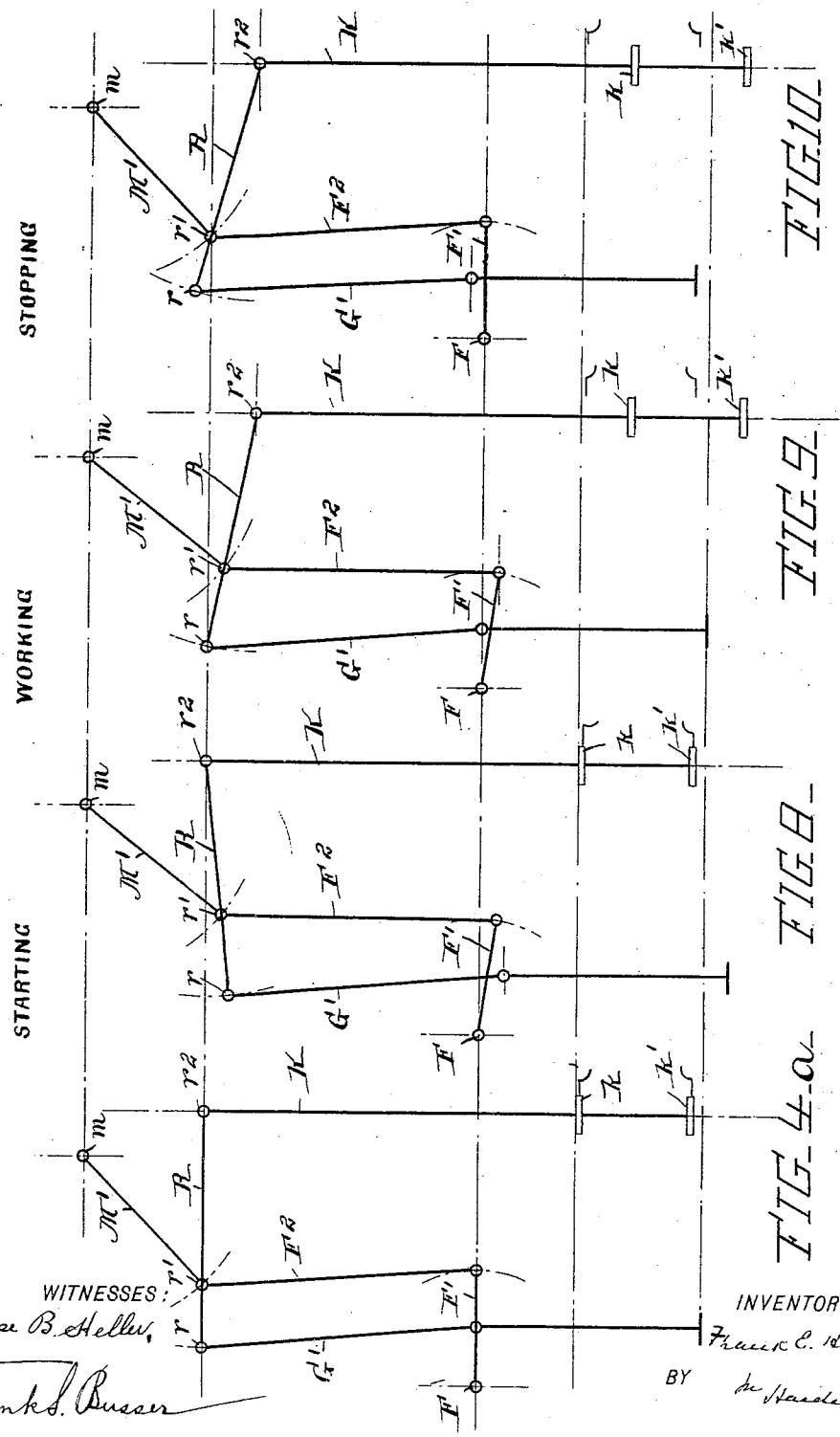

UNITED STATES PATENT OFFICE.

FRANK E. HERDMAN, OF WINNETKA, ILLINOIS.

SPEED-REGULATING DEVICE FOR HYDRAULIC ELEVATORS.

SPECIFICATION forming part of Letters Patent No. 623,152, dated April 18, 1899.

Application filed October 8, 1898. Serial No. 692,976. (No model.)

*To all whom it may concern:*

Be it known that I, FRANK E. HERDMAN, a citizen of the United States, residing at Winnetka, county of Cook, and State of Illinois, have invented a new and useful Improvement in Speed-Regulating Devices for Hydraulic Elevators, of which the following is a full, clear, and exact description, reference being had to the accompanying drawings, which form a part of this specification.

My invention relates to speed-regulating devices for elevators operated by fluid-pressure; and its general object is to provide a speed-governor which will maintain a uniform speed of the cage or car with varying loads.

In a hydraulic or other fluid-pressure-operated elevator not provided with speed-regulating devices the speed of the car will vary with the load on the car. For example, in the plunger type of machine, where the weight of the plunger lifts the load and the water-pressure lowers the load by lifting the plunger, if the load on the car be heavy the difference in weight between the load and the plunger will be slight, producing a correspondingly light pressure in the cylinder, and when the operating-valve is moved to connect the cylinder with the discharge the water will be exhausted but slowly, causing a correspondingly slow ascent of the car, and likewise under similar conditions of heavy load if the operating-valve be moved to connect the cylinder with the supply, the dead-weight of the plunger being light, the water will be forced into the cylinder with great velocity, causing the car to descend with great rapidity. In the same way with a light load on the car, the difference in weight between the load and plunger being considerable and the pressure in the cylinder being correspondingly great, the car will ascend rapidly and descend slowly.

In an application filed by me January 23, 1897, Serial No. 620,323, I have described a speed-regulating apparatus capable of use in connection with any fluid-pressure-operated elevator, but shown and described in its application to the plunger type of machine, this regulating apparatus comprising a regulating device or valve located at the supply and exhaust port controlled by the operating-valve and operatively connected with a piston in an auxiliary hydraulic cylinder in connection with the main elevator-cylinder, the piston being spring-pressed on one side and subject to the hydraulic pressure transmitted from the main cylinder on the other side. The extent to which the spring will be compressed is in direct ratio with the pressure in the main cylinder, and to the extent that the spring is compressed the regulating device by its connection with the piston before mentioned will be moved proportionately to choke the exhaust-perforations and enlarge the supply-perforations in the supply and exhaust port controlled by the operating-valve. Thus if the load on the car be light and the pressure in the cylinder proportionately great the regulating device will be moved to widen the openings in the supply and exhaust port for the supply and narrow the openings for the exhaust, thus preventing excessive slowness of descent and excessive speed of ascent. If the load on the car be heavy and the pressure in the cylinder consequently light, the regulating-valve will be moved by the spring against the pressure of the water in the opposite direction, widening the openings for the exhaust and narrowing the openings for the supply, thus preventing excessive slowness of ascent and excessive speed of descent, and throughout intermediate variations of load and pressure the regulating-valve will be adjusted to vary the size of the supply and exhaust perforations accordingly and maintain a uniform speed of travel of the car in spite of variations of load. The pressure in the cylinder being determined by the load in the car and the load being fixed in the normal operation of the elevator while the car is at rest and remaining unchanged during starting, running, and stopping, it will be understood that this regulating-valve is set only when the car is at rest and remains set during the operation of the elevator. My present invention embodies the same principle of varying the size of the openings for the supply and discharge proportionate to the load in the car and the pressure in the cylinder, but broadly differs from the invention of my prior application in that an additional regulating-valve is dispensed with and the operating-valve itself so constructed and connected that it is made to perform the dual function of controlling the travel of the car and regulating its speed. It differs more specifically from the invention of my prior application in that the valve is so connected with the auxiliary pressure-cylinder that its limit of longitudinal movement is restricted to an extent either directly or inversely proportionate to the pressure in the operating-cylinder, dependent upon whether, with a given pressure, the valve is moved to connect the operating-cylinder with the supply or the exhaust—that is, when the pressure in the cylinder is at its maximum, due to a light load in the car, it is desirable to have the largest freedom of supply and the most restricted discharge to insure uniform speed, and so under these conditions the operating-valve by suitable connections with the controlling mechanism and pressure-cylinder is permitted to move to connect with the supply to its maximum extent and restricted in its movement to be connected with the discharge, so that it moves to the minimum extent. With a minimum pressure in the operating-cylinder due to a heavy load the opposite conditions are met, and by the connections referred to opposite capacities of movement of the operating-valve are effected. Thus I am enabled by a reconstruction of the connections with the operating-valve to maintain the speed uniform throughout wide variations of load and pressure, while dispensing with the additional regulating-valve essential to the broad invention of my prior application.

Figure 2:
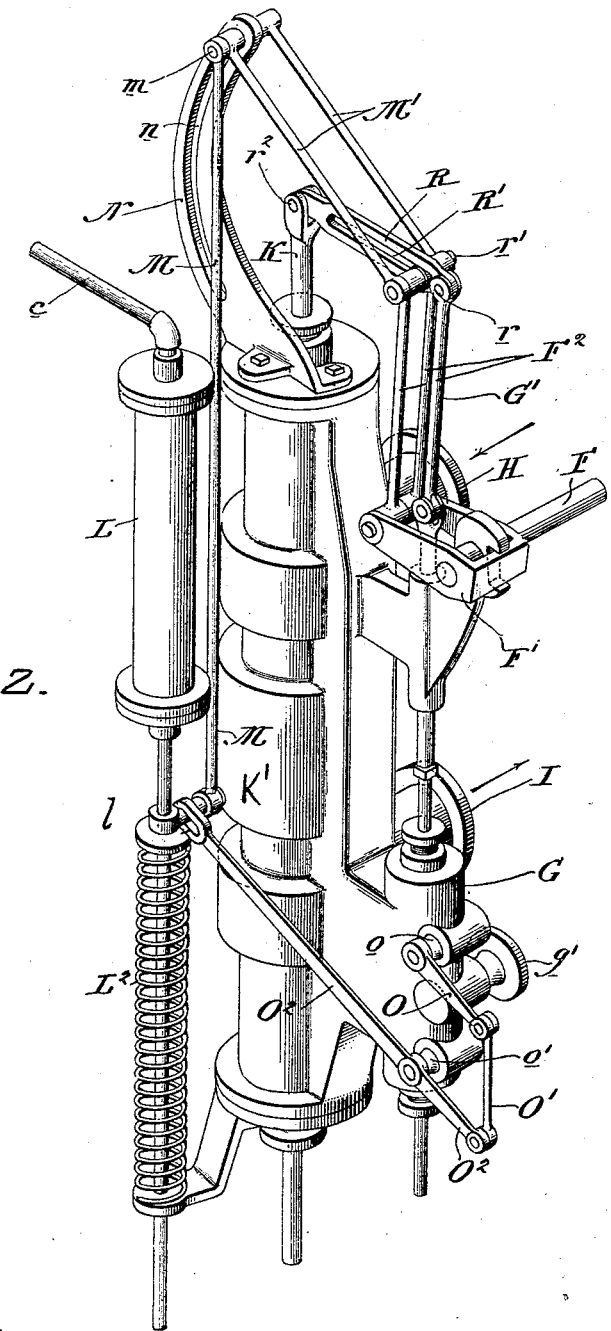

In the drawings, Figure 1 is a side elevation of car, operating-cylinder, operating-valve, and its operating and speed-regulating connections. Fig. 2 is a perspective view showing the operating-valve, controlling pilot-valve therefor, auxiliary pressure-cylinder, and speed-regulating connections between the two latter and the former. Fig. 3 is a longitudinal sectional view of the devices shown in perspective in Fig. 2 plus the lower portion of the operating-cylinder. Figs. 4 to 10 are diagrammatic views illustrating the relative positions of the connections between the operating-bar, pilot-valve, operating-valve, and auxiliary pressure-cylinder with a maximum load in the car, Fig. 4 illustrating said positions when the car is at rest and the operating-bar is central; Fig. 5, when the operating-bar has been moved in the direction to move the car up; Fig. 6, during the upward travel of the car; Fig. 7, when the bar is moved to stop the car; Fig. 4ª, after the car has come to rest; Fig. 8, when the bar has been moved in the direction to move the car down; Fig. 9, during the downward travel of the car; Fig. 10, when the bar is moved to stop the car.

A is the car or cage; B, the counterbalancing-weights; C, the operating-cylinder; C', the plunger therein; D D' D², the pulleys around which passes the lifting-cable D³, secured at one end to the car and at the other end to the beam on which pulleys D' and D² are mounted; E, the operating-cable, passing around sheaves E', E², E³, and E⁴ and attached at its ends to the rock-shaft F, which by the system of levers usual in hydraulic elevators, to be hereinafter described, is connected with the pilot-valve G.

H is the inlet or supply port, connecting through the operating-valve chamber K' and port J with the elevator or operating-cylinder C.

K is the operating-valve in chamber K'.

I is the outlet-port.

$k\ k'$ are the valve-heads on the valve K. (Shown in Fig. 3 at its central position.) This valve is controlled and moved by means of the piston-heads $k^2\ k^3$, which are brought in connection with the motor through the medium of valve G, having the inlet-port $g$ and passage $g'$, leading to the operating-valve chamber on one side of the piston-head $k^2$, and the passage $g^2$, leading to one side of the piston-head $k^3$, while the passage $g^3$ leads to the exhaust. By operating the pilot-valve G by the mechanism to be hereinafter described under the control of the operator connection may be made between the operating-cylinder and either the inlet or discharge port.

F is the operating-shaft, controlled by the operator in the car, as above described.

F' is a rocking lever secured to the shaft F.

$F^2$ is a link pivoted at one end to the lever F' and at the other end having a pin working in a slot R' in floating lever R. One end of this floating lever is connected to the stem of the operating-valve K at $r^2$ and the other end to a link G' at $r$, which in turn is connected to the stem of the pilot-valve G.

In the usual elevator-operating mechanism the link $F^2$ instead of working in a slot in the floating lever R is pivoted to an intermediate point of the floating lever, so that when the operating-shaft F is thrown in either direction this floating lever R operates on its connection with the main-valve plunger as a fulcrum, due to the fact that the power required to move this main valve is greater than that required to move the pilot-valve, and shifts the pilot-valve, which in turn by the connections before described shifts the operating-valve. As soon as the main-valve plunger moves, the controlling mechanism having no further movement, the floating lever then operates on its connection with the link $F^2$ as a fulcrum, thereby shifting the pilot-valve back to its cut-off position, which when reached the further movement of the operating-valve is checked. In this manner the distance which the operating-valve moves is directly controlled by the amount that the pilot-valve is shifted by the operating mechanism. This construction is substantially what is done in common practice. It will be readily seen that if the connection between this floating lever R and the operating-shaft through link $F^2$ is made to shift, so as to change the relative leverages between the main operating-valve and this connection and between the pilot-valve and this connection, the amount of travel of the operating-valve will be correspondingly affected, either being increased by the shifting of the pivotal connection of link F² toward the point r or decreased by the shifting of its pivotal connection away from point r. It is obvious that if this pivotal connection is so shifted and the relative leverages so changed automatically by the conditions of pressure in the cylinder the extent of travel of the main-valve plunger may be made to correspond thereto, thereby decreasing or increasing the size of the valve-ports, and thus accomplishing regulation of speed. This my invention accomplishes, although it is to be understood that the invention is not limited in its application to the shifting of the connection between the operating-shaft and floating lever, nor to the particular devices that I shall describe to effect this shifting.

The floating lever is slotted and the link F² guided therein, as before described.

L is a pressure-cylinder connected by pipe c with the operating-cylinder C. In the cylinder L is a piston L', the stem of which extends through the bottom of the cylinder and works against a spring L². The extent to which this plunger is depressed against the spring depends upon the pressure in the elevator-cylinder, which acts upon the upper face of piston L'. The pressure in the cylinder is varied with the load in the car, which is fixed when the car is at rest by taking on or discharging passengers or freight and consequently remains fixed during the travel of the car. The plunger therefore remains stationary between stops and during the shifting of valve K. This pressure-cylinder does not differ in principle from the one described in my said prior application.

The piston L' is connected at l with one end of a link M, the other end of link M being connected with one end of a second link M', the other end of which moves in the slot R' and is pivoted to link F². The pin m, forming the pivotal connection between links M and M', is guided in a slot n in bracket N, secured to the operating-valve casing. It will be understood from the preceding description that the position of link M' in the slot n is fixed while the car is at rest and remains fixed during starting, running, and stopping.

Assuming the load on the car to be at its maximum, under which condition, as before described, the excess weight of the piston and the consequent pressure in the cylinder will be at their minimum, the spring L² will be compressed to its least extent and the piston in cylinder L will be at its upper position, and in such position it holds the connection m at its upper position in the guiding-slot n. This is the position illustrated in the drawings. If under these conditions the operating-shaft is thrown so as to carry the pilot-valve downward, (see Fig. 8,) which is the position for the operating-valve to also move downward and in consequence opening the supply to the elevator-cylinder, the link M' will necessarily draw the connection r' in the slot of the floating lever toward the connection at r², thereby changing the ratio of the two parts of the floating lever between r and r' and r' and r², making them nearer the same length. Such being the case, the travel of the operating-valve (see Fig. 9) will be correspondingly limited, so as to be more nearly the travel of the pilot-valve, as it will that much sooner in its travel cause the pilot-valve to close and check its own movement. Now it can be readily seen that when the pressure is light in the elevator-cylinder is just when the supply-port (if that be the port connected with the cylinder) should be open the least. This is precisely what occurs under the action just described, for the travel of the operating-valve has been reduced to the minimum movement desired, so as to choke the ports to the greatest desired extent. To stop the car, the operating-bar is thrown to the center, (see Fig. 10,) opening the pilot-valve, whereupon the main valve is moved to its central position, at the same time returning the pilot-valve to its central position. (See Fig. 4ᵃ.) If under the same conditions the operating-bar is thrown so as to carry the pilot-valve upward, (see Fig. 5,) which is the position for the operating-valve to also move upward and in consequence opening the discharge to the elevator-cylinder, the link M' will necessarily draw the connection r' in the slot of the floating lever toward the connection at r. Such being the case, the greatest possible travel (see Fig. 6) will be permitted to the operating-valve and the discharge-port will be opened to its widest extent before the pilot-valve is closed, which is precisely the result desired with a heavy load and light pressure. To stop the car, the operating-bar is thrown to the center, (see Fig. 7,) opening the pilot-valve, whereupon the main valve is moved to the central position, at the same time returning the pilot-valve to its central position. (See Fig. 4ᵃ.) If the pressure in the cylinder is great, then this connection m is carried to the lower end of the guiding-slot n. Under this condition if the operating-shaft is turned to throw the valve downward to connect with the supply the ratio between r and r' and r' and r² will be increased and the operating-valve moved to its maximum extent and the maximum opening given for the supply. Under the same condition of great pressure in the cylinder if the operating-shaft is turned to throw the valve upward to connect with the discharge the ratio between r and r' and r' and r² will be decreased and the operating-valve moved to its minimum extent and the minimum opening given for the discharge. With intermediate variations in pressure and load it will be perceived that the connection m will occupy intermediate positions in the slot n proportionate to the cylinder-pressure, and thus insure a corresponding restriction of longitudinal movement of the operating-valve.

It should be understood that strictly speaking there is a tendency to a temporary rise or fall in the cylinder-pressure immediately following the quick opening or closing of the supply, and other causes may produce slight fluctuations in pressure while the main valve is shifted to open the supply and exhaust port to either supply or exhaust. I have, however, shown no means to prevent these fluctuations in pressure during the travel of the car from being effective to cause slight shiftings of the speed-governing devices, as in a separate application, Serial No. 692,779, hereinafter referred to, I have shown, described, and claimed means for controlling the action of the automatic devices when the car is not at rest or during starting, running, and stopping.

While the proportionate length and relative location of link M', floating lever R, and link F², as shown in Figs. 4 to 10, do not precisely correspond with the same parts as shown in Figs. 2, 3, and 4, it should be understood that Figs. 4 to 10 illustrate more nearly accurately the relative measurements and positions of these parts when embodied in an organized machine, it being a matter of mere mechanical skill to adjust these parts (if the specific construction shown is adopted) so as to accomplish the best results.

The devices, so far as I have described them, are supplemented by the following arrangement to regulate the speed of opening of the operating-valve to correspond with the extent of movement thereof. It is obvious that if the opening for the supply fluid through the pilot-valve that actuates the operating-valve remains the same under these various conditions then when the operating-valve is controlled for its short movement, so as not to move with undue rapidity, its motion for the long movement is too slow. I have availed myself of the pressure-cylinder to control the supply to the pilot-valve. In the passage g from the supply I place two cocks o o', one for each end of the pilot-valve. These cocks are so adjusted that they will not entirely close this passage, but simply gradually choke it from full opening to the minimum opening for which they are adjusted. These cocks are connected by links O O' O² with the piston-rod of cylinder L. When there is no pressure in the elevator-cylinder, the piston in the cylinder A will be in its extreme upper position, (the position shown in the drawings,) and when the supply is admitted to the elevator-cylinder it is choked in consequence of the limited movement of the operating-valve, as before described. Therefore it is desirable that the cock o (which controls the passage to the upper part of the valve-chamber) should be turned to choke this passage and insure a slow movement of the operating-valve corresponding to its short travel. It will be seen that the cock o is so set that under these conditions it does choke this passage, while the cock o' (which controls the passage to the lower end of the valve-chamber) is so turned that it is opened to its fullest extent, permitting a rapid movement of the valve corresponding to its greater travel, when under these conditions the exhaust is admitted to the elevator-cylinder. If, on the other hand, the pressure in the pressure-cylinder increases, the piston-rod therein, through its link connections, opens wider the cock o and correspondingly chokes the cock o' until with a maximum pressure the cock o is opened to its fullest extent and the cock o' moved to very much restrict the passage it controls, thereby accomplishing the regulation of speed of travel of the operating-valve proportionate to its range of movement.

While I have described my invention as applied to the plunger type of hydraulic elevator, it is obvious that it is capable of application to any other type of hydraulic elevator or to any fluid-pressure-operated cylinder. It is also obvious that the combined operating and speed-governing valve, instead of controlling the supply and exhaust port for the cylinder, may be arranged to control separately the supply-port and discharge-port, which are in connection with the elevator-cylinder through the operating-valve chamber.

I do not herein claim, broadly, a combined operating and speed-governing valve in combination with means manually controlled from the car for operating the valve to open and close the port controlled by said valve and automatic devices connected with the elevator mechanism to regulate the extent of opening of said port by said valve, as such broad invention forms the subject-matter of a separate application, filed October 6, 1898, and serially numbered 692,779.

Having now fully described my invention, what I claim, and desire to protect by Letters Patent, is—

1. In a fluid-pressure-operated elevator, in combination, an elevator-cylinder, a port communicating with said cylinder, a combined operating and speed-regulating valve controlling said port, means manually controlled from said car for operating said valve to open and close said port, and automatic devices connected with the elevator mechanism to limit the extent of movement of said valve and thereby regulate the extent of opening of said port.

2. In a fluid-pressure-operated elevator, in combination, an elevator-cylinder, a port communicating with said cylinder, a combined operating and speed-regulating valve controlling said port, means manually controlled from said car for operating said valve to open and close said port, a pressure device controlled by the pressure in the elevator-cylinder, and automatic devices connected with and actuated by said pressure device to limit the extent of movement of said valve and thereby regulate the extent of opening of said port.

3. In a fluid-pressure-operated elevator, in combination, an elevator-cylinder, a valve-chamber, supply and discharge passages in said chamber for admitting supply to and exhausting from the cylinder, a combined operating and speed-regulating valve adapted to close said passages when in its intermediate position and to open to the elevator-cylinder said supply-passage by a movement in one direction and said discharge-passage by a movement in the opposite direction, means manually controlled from the car for operating said valve, a pressure device controlled by the pressure in the elevator-cylinder, and automatic devices connected with and actuated by said pressure device to limit the extent of movement of said valve and thereby regulate the extent of opening of both the supply and discharge passages by said valve.

4. In a fluid-pressure-operated elevator, in combination, an elevator-cylinder, a valve-chamber, supply and discharge passages in said chamber for admitting supply to and exhausting from the cylinder, a combined operating and speed-regulating valve adapted to close said passages when in its intermediate position and to open to the elevator-cylinder said supply-passage by a movement in one direction and said discharge-passage by a movement in the opposite direction, means manually controlled from the car for operating said valve, and automatic devices connected with the elevator mechanism to limit the extent of movement of said valve and thereby regulate the extent of opening of both the supply and discharge passages by said valve.

5. In a fluid-pressure-operated elevator, in combination, an elevator-cylinder, a port communicating with said cylinder, a combined operating and speed-regulating main valve controlling said port, an auxiliary valve controlling a fluid-passage to the main valve for actuating the main valve, a connection between the main valve and the auxiliary valve, whereby the latter is shifted to close said passage by said main valve, manual devices on the car for actuating the auxiliary valve, a pressure device controlled by the pressure in the elevator-cylinder, and automatic devices connected with and actuated by said pressure device for varying the main-valve throw.

6. In a fluid-pressure-operated elevator, in combination, an elevator-cylinder, a port communicating with said cylinder, a combined operating and speed-regulating main valve controlling said port, an auxiliary valve controlling a fluid-passage to the main valve for actuating the main valve, a connection between the main valve and the auxiliary valve, whereby the latter is shifted to close said passage by said main valve, manual devices on the car for actuating the auxiliary valve, and automatic devices connected with the elevator mechanism for varying the main-valve throw.

7. In a fluid-pressure-operated elevator, in combination, an elevator-cylinder, a port communicating with said cylinder, a combined operating and speed-regulating main valve, controlling said port, an auxiliary valve controlling a fluid-passage to the main valve for actuating the main valve, a pivoted lever connecting the stems of the two valves, whereby the auxiliary valve is shifted to close said passage by said main valve, manual devices on the car for actuating the auxiliary valve, a pressure device controlled by the pressure in the elevator-cylinder, and automatic devices connected with and actuated by said pressure device for shifting the pivot of said lever and thereby varying the main-valve throw.

8. In a fluid-pressure-operating elevator, in combination, an elevator-cylinder, a port communicating with said cylinder, a combined operating and speed-regulating main valve, controlling said port, an auxiliary valve controlling a fluid-passage to the main valve for actuating the main valve, a pivoted lever connecting the stems of the two valves, whereby the auxiliary valve is shifted to close said passage by said main valve, manual devices on the car for actuating the auxiliary valve, automatic devices connected with the elevator mechanism for shifting the pivot of said lever and thereby varying the main-valve throw.

9. In a fluid-pressure-operated elevator, in combination, an elevator-cylinder, a port communicating with said cylinder, a combined operating and speed-regulating main valve controlling said port, an auxiliary valve controlling a fluid-passage to the main valve for actuating the main valve, a connection between the main valve and the auxiliary valve, whereby the latter is shifted to close said passage by said main valve, manual devices on the car for actuating the auxiliary valve, a pressure device controlled by the pressure in the elevator-cylinder, and automatic devices connected with and actuated by said pressure device for varying the main-valve throw, and automatic means connected with and actuated by said pressure device to regulate the speed of movement of the main valve to an extent proportionate to the variation of throw of the main valve.

10. In a fluid-pressure-operated elevator, in combination, an elevator-cylinder, a port communicating with said cylinder, a combined operating and speed-regulating main valve controlling said port, an auxiliary valve controlling a fluid-passage to the main valve for actuating the main valve, a connection between the main valve and the auxiliary valve, whereby the latter is shifted to close said passage by said main valve, manual devices on the car for actuating the auxiliary valve, and automatic means connected with the elevator mechanism to vary the main-valve throw and to regulate the speed of movement of the main valve to an extent proportionate to the variation of throw of the main valve.

11. In a fluid-pressure-operated elevator, in combination, an elevator-cylinder, a port communicating with said cylinder, a combined operating and speed-regulating main valve, controlling said port, an auxiliary valve controlling a fluid-passage to the main valve for actuating the main valve, a pivoted lever connecting the stems of the two valves, whereby the auxiliary valve is shifted to close said passage by said main valve, manual devices on the car for actuating the auxiliary valve, a pressure device controlled by the pressure in the elevator-cylinder, and automatic devices connected with and actuated by said pressure device for shifting the pivot of said lever and thereby varying the main-valve throw, and automatic means connected with and actuated by said pressure device for choking said passage to an extent proportionate to the variation of throw of the main valve.

12. A fluid-pressure-operated elevator, in combination, an elevator-cylinder, a port communicating with said cylinder, a combined operating and speed-regulating main valve, controlling said port, an auxiliary valve controlling a fluid-passage to the main valve for actuating the main valve, a pivoted lever connecting the stems of the two valves, whereby the auxiliary valve is shifted to close said passage by said main valve, manual devices on the car for actuating the auxiliary valve, and automatic means connected with the elevator mechanism for shifting the pivot of said lever and thereby varying the main-valve throw, and for choking said passage to an extent proportionate to the variation of throw of the main valve.

13. In a fluid-pressure-operated elevator, in combination, an elevator-cylinder, a port communicating with said cylinder, a combined operating and speed-regulating valve controlling said port, means manually controlled from said car for operating said valve to open and close said port, and automatic devices connected with the elevator mechanism to limit the extent of movement of said valve and thereby regulate the extent of opening of said port, and automatic means connected with the elevator mechanism to limit the speed of opening of said valve proportionate to the limitation of its extent of travel.

14. In a fluid-pressure-operated elevator, in combination, an elevator-cylinder, a port communicating with said cylinder, a combined operating and speed-regulating valve controlling said port, means manually controlled from said car for operating said valve to open and close said port, a pressure device controlled by the pressure in the elevator-cylinder, and two sets of automatic devices connected with said pressure device, one to limit the extent of opening of said valve, and thereby regulate the extent of opening of said port, and the other to limit the speed of opening of said valve proportionate to the limitation of its extent of travel.

15. In a fluid-pressure-operated elevator, in combination, an elevator-cylinder, a valve-chamber, supply and discharge passages in said chamber for admitting supply to and exhausting from the cylinder, a combined operating and speed-regulating valve adapted to close said passages when in its intermediate position and to open to the elevator-cylinder said supply-passage by a movement in one direction and said discharge-passage by a movement in the opposite direction, means manually controlled from the car for operating said valve, and automatic devices connected with the elevator mechanism to limit the extent of movement of said valve and thereby regulate the extent of opening of both the supply and discharge passages by said valve and to limit the speed of opening of said valve proportionate to the limitation of its extent of travel.

16. In a fluid-pressure-operated elevator, in combination, an elevator-cylinder, a valve-chamber, supply and discharge passages in said chamber for admitting supply to and exhausting from the cylinder, a combined operating and speed-regulating valve adapted to close said passages when in its intermediate position and to open to the elevator-cylinder said supply-passage by a movement in one direction and said discharge-passage by a movement in the opposite direction, means manually controlled from the car for operating said valve, a pressure device controlled by the pressure in the elevator-cylinder, and automatic devices connected with and actuated by said pressure device to limit the extent of movement of said valve and thereby regulate the extent of opening of both the supply and discharge passages by said valve, and to limit the speed of opening of said valve proportionate to the limitation of its extent of travel.

In testimony of which invention I have hereunto set my hand, at Bay View, Michigan, on this 30th day of August, 1898.

FRANK E. HERDMAN.

Witnesses:
CHILLION L. SMITH,
EDWIN E. ALLEN.